United States Patent [19]

Lovrenich

[11] 4,446,427
[45] May 1, 1984

[54] MEASURING AND CONTROL DEVICE USING THE DAMPING EFFECT OF A RESISTIVE EFFECT ELEMENT ON THE INDUCTOR OF A TUNED CIRCUIT

[76] Inventor: Rodger T. Lovrenich, 209 Whispering Sands, Santa Teresa, N. Mex. 88063

[21] Appl. No.: 246,167

[22] Filed: Mar. 23, 1981

[51] Int. Cl.³ .................. G01B 7/00; G01N 27/72; G01R 33/12
[52] U.S. Cl. .................. 324/207; 324/227; 324/234; 324/236; 331/65; 331/165
[58] Field of Search .................. 324/207–209, 324/224, 260, 222, 237, 227, 61 QS, 57 Q, 60 CD, 54, 228, 336, 234; 331/65, 57, 165

[56] References Cited

U.S. PATENT DOCUMENTS 3,163,818 12/1964 Spaven .................. 324/57 Q
3,732,443 5/1973 Lovrenich .................. 331/65 X
3,990,002 11/1976 Baum .................. 324/54
4,068,189 1/1978 Wilson .................. 324/236 X Primary Examiner—Gerard R. Strecker
Assistant Examiner—Warren S. Edmonds
Attorney, Agent, or Firm—Brown & Martin

[57] ABSTRACT

A detection type device that includes an arrangement for detecting the energy absorbed by a resistive effect element in proximity to the inductor of a resonant circuit. The resonant circuit uses a direct current source to alternatively charge it and then let it ring through a switch connected between the direct current source and the resonant circuit. Two different parameters of the same oscillating signal generated by the resonant circuit are detected and compared. The difference is the result of a ratio of these parameters that accurately reflects the energy absorbed by the resistive effect element. This difference is used for measurement and control purposes.

17 Claims, 10 Drawing Figures

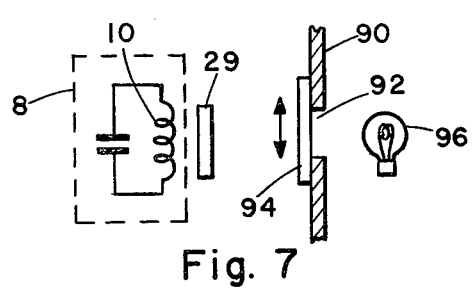
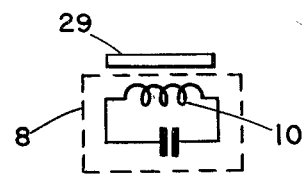
Fig. 7
Fig. 8
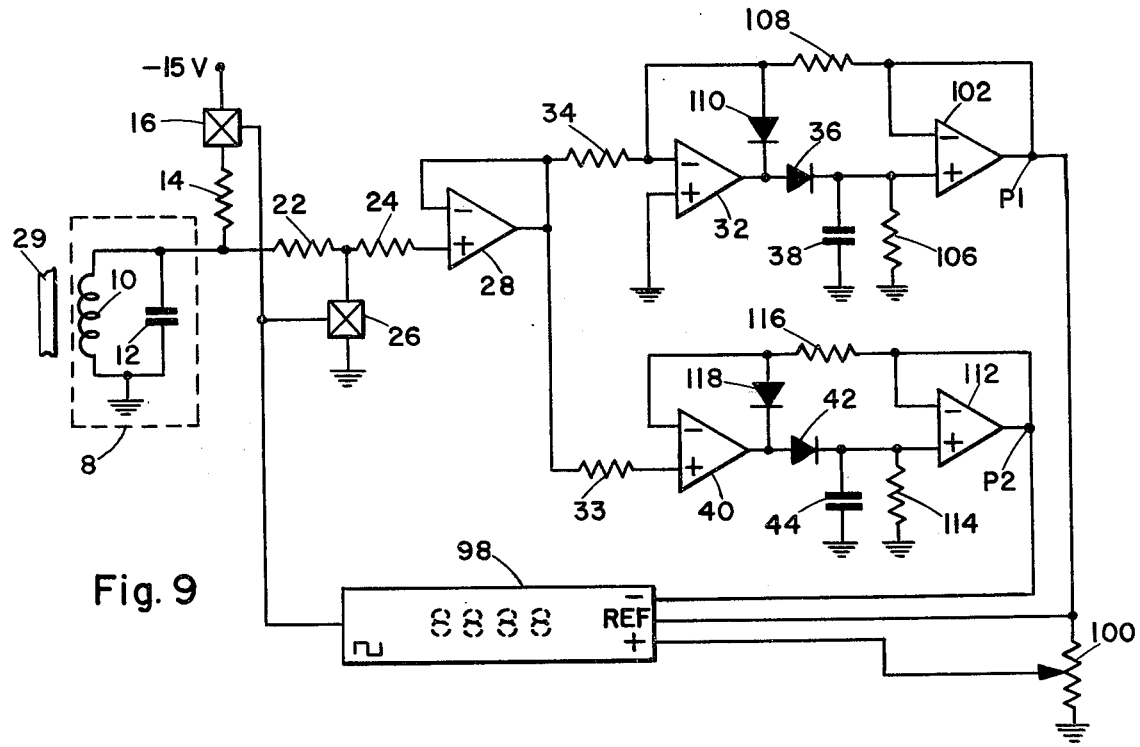
Fig. 9
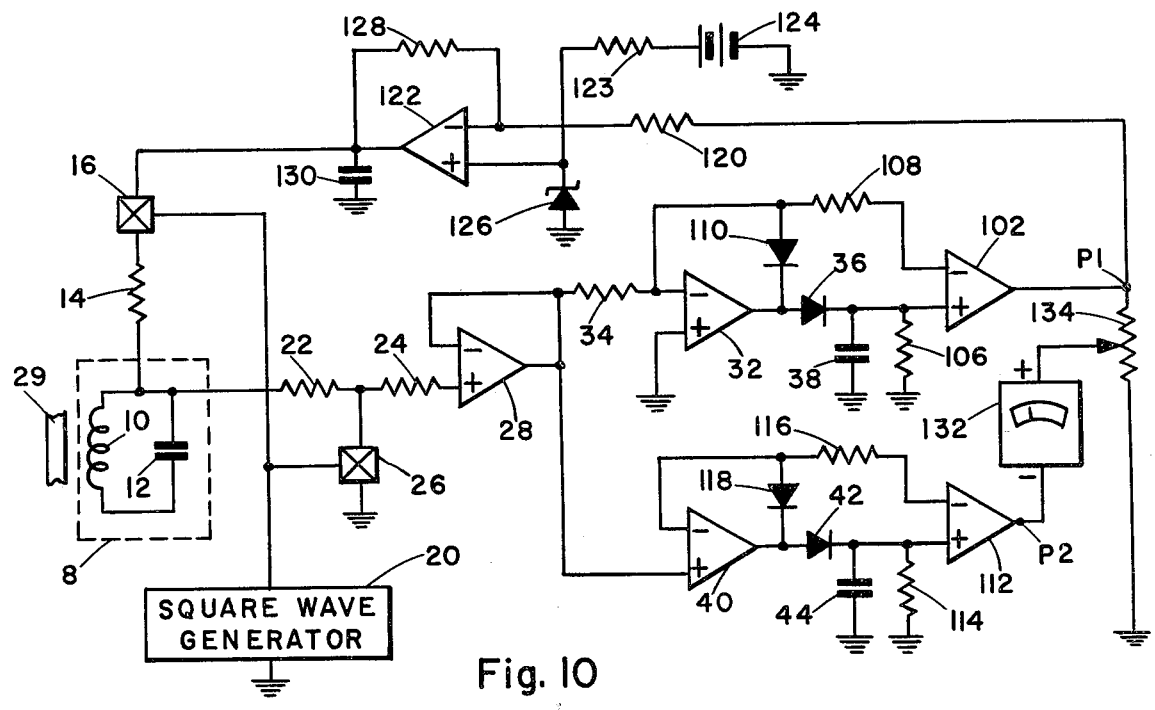
Fig. 10

MEASURING AND CONTROL DEVICE USING THE DAMPING EFFECT OF A RESISTIVE EFFECT ELEMENT ON THE INDUCTOR OF A TUNED CIRCUIT

BACKGROUND OF THE INVENTION

The invention relates to a detecting device including sensing means for accurately detecting characteristics of a medium in proximity to said sensing means. Position is one such characteristic.

Prior art sensors used as proximity or position detectors for example are subject to various problems. A typical position detector is a mechanical limit switch. The contacts of such a switch create bounce which causes considerable difficulty in the switch circuit. Additional circuit elements are required to handle this problem which adds cost to the device. The switch contacts wear and the mechanical switch elements wear over a period of time causing a change in the mechanical point of switching with time. The use of mechanical switch elements makes it difficult to determine position within a high degree of accuracy due to the necessity of holding the movable mechanical parts in precise positions.

Some position detection devices have been developed which eliminate the use of the mechanical parts. However, these devices involve complex circuitry and do not attain the high degree of reliability which is sought by the user. Existing devices require balancing and "tweeking" of the circuit to the sensor thereby eliminating interchangeability of sensors without readjusting the circuit for proper operation with the new sensor. When such devices fail, there is no means to immediately detect the inoperability of the device.

SUMMARY OF THE INVENTION

An exemplary embodiment of the present invention overcomes the deficiencies of the prior art by providing resonant circuit means, power supply means for periodically charging said resonant circuit means, said resonant means ringing and providing an oscillating signal upon disconnection of said power supply means, and means for comparing two different parameters of the same oscillating signal as the resistive effect of the inductance means in the tuned circuit is altered by the presence of an external energy absorbing medium. The ratio of the two different parameters of the oscillating signal is utilized for information and/or control purposes.

The invention embodies no moving parts and uses standard electrical and electronic components to provide a simple, highly sensitive and extremely accurate detection means for determining characteristics of a proximate medium, such as position or electrical conductance for example. The device readily lends itself to means for self diagnosis and is computer compatible.

DESCRIPTION OF THE DRAWINGS

FIG. 7 is a schematic view demonstrating the sensor of the present invention used to sense light values.

FIG. 8 is a schematic view demonstrating the sensor of the present invention as it is used to sense heat, electrical conductivity or thickness.

FIG. 9 is a circuit diagram showing the sensor of the present invention using a ratiometric voltmeter to generate switch signals and to indicate the oscillating signal decrement ratio.

FIG. 10 is a circuit diagram showing the sensor of the present invention utilizing a feedback loop for maintaining the first peak of the oscillating signal at a constant value.

DETAILED DESCRIPTION OF THE INVENTION

Figure 1:
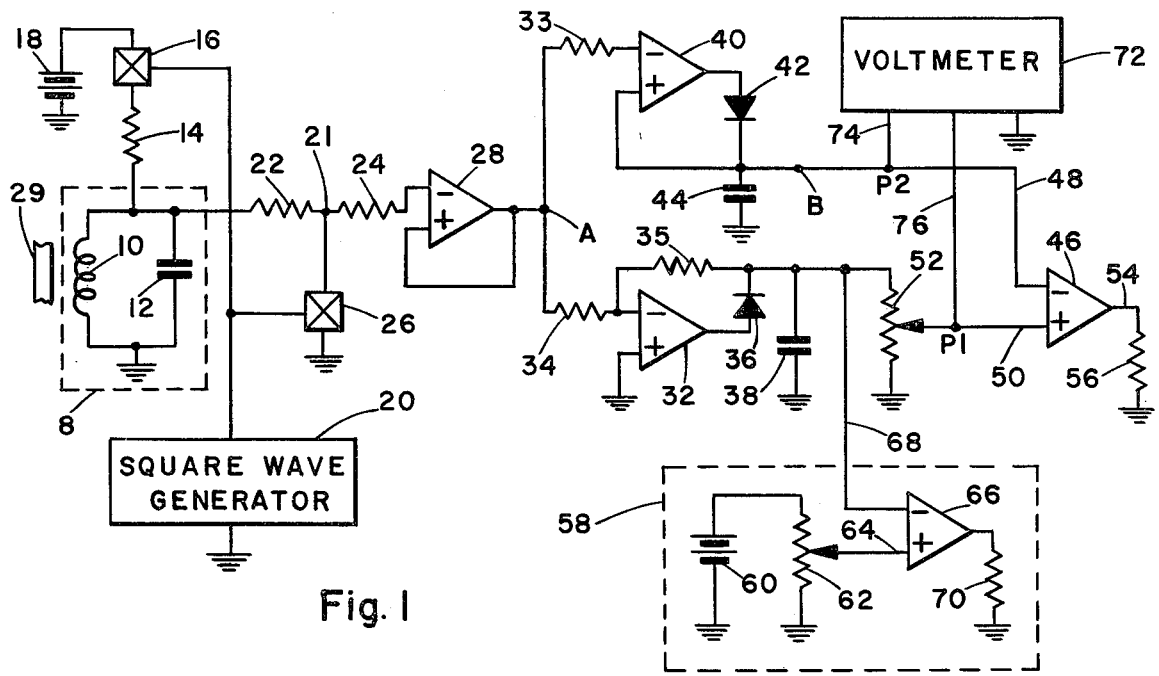
FIG. 1 is a circuit diagram disclosing an embodiment of the present invention embodying peak detection means for comparing peak voltages of an oscillating signal generated by the resonant circuit of a sensor to indicate position of an energy absorbing medium proximate the resonant circuit.

The device of the present invention incorporates elements for measuring the damping effect of a resistive effect element on an oscillatory circuit that is periodically excited, and using the measured damping effect for control and/or measurement purposes. The measured damping effect is always the result of a ratio resulting from the comparison of two different parameters of the same oscillating signal.

The comparison can involve two different parameters that represent the same characteristic of the signal in different half cycles (instantaneous voltage or current at the same point in two different half cycles of the same oscillating signal for example); two different parameters representing different characteristics of the same oscillating signal in the same half cycle (peak voltage or current and average voltage or current for example); and two different parameters representing two different characteristics of the same oscillating signal in two different half cycles (average voltage or current of one half cycle and root mean square voltage or current of a different half cycle for example).

Thus, it will be seen that the word "parameter" as used herein includes a characteristic of the oscillating signal such as the instantaneous voltage or current in a half cycle, an average voltage or current in a half cycle and RMS voltage or current.

Although voltages are described and claimed herein, it is obvious to one skilled in the art that currents can be measured and used in the same manner and are equivalents.

Referring to the drawings, a sensor 8 includes a resonant circuit embodying an inductor 10 and a capacitor 12. One end of the resonant circuit is connected to ground and the other end is connected through resistor 14 and electronic switch 16 to the positive side of a d.c. power source 18. The electronic switch 16 is connected to square wave generator 20 and the generator is also connected to the electronic switch 26 which is connected to the output line 21 of the resonant circuit between resistors 22 and 24. Electronic switches and square wave generators are well known and readily available from various sources. The d.c. supply can be ten volts and the square wave generator can operate at one kilohertz for example although not limited to these values.

The square wave generator 20 continually turns both switches 16 and 26 on and off simultaneously. When switches 16 and 26 are turned on, a positive ten volts charges the sensor 8 through switch 16. A charging current spike occurs when the sensor 8 is first energized and this spike is fed to ground through switch 26.

The square wave generator 20 then turns off switches 16 and 26 and the resonant circuit of sensor 8 oscillates, generating a damped sine wave input through line 21 into operational amplifier 28 which is a buffer that isolates the resonant circuit of sensor 8 from any loading by the circuit components following buffer 28.

The oscillating circuit of the present invention differs from the usual oscillating circuits which normally are active and are controlled closely to provide a particular desired frequency. The oscillating circuit used in the present invention is passive and does not require special biasing and close monitoring of the frequency generated by the oscillating signal. The oscillator circuit does not include feedback, and frequency drift and distortion can be ignored. Time is not critical because the device is not measuring within a carefully controlled time period. Voltage can drift without adverse effect because the device measures the ratio of different parameters of the same signal as opposed to existing art which measure the change in some circuit parameter from its starting or zero condition.

FIG. 1 of the drawings shows an energy absorbing element such as conductor 29 which is movable toward and away from inductor 10 to vary its loading effect on the magnetic field of inductor 10 in the tuned circuit 8. This element 29 may be referred to herein from time to time as a "resistive effect" element or means which signifies an electrical conductor which absorbs energy from a magnetic field and which places a resistive load on the circuit that generates the magnetic field. The conductor can be a metal finger on a machine slide with the sensor 8 positioned on the fixed frame of the machine to provide a proximity sensor for example.

Figure 2:
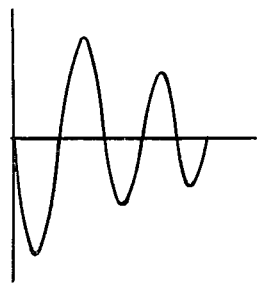
FIG. 2 depicts a damped oscillating signal when no external energy absorbing medium is proximate the resonant circuit of the sensor of FIG. 1.

Due to the resistance inherent in the inductor 10 and the wire in the circuit of sensor 8, the oscillations will dampen as shown in FIG. 2 of the drawings in accordance with the formula:

$$E(t) = E(m) \sin W(t) e^{-kt}$$

wherein:
E(t) is the voltage at time t
E(m) is the peak voltage
k is a factor related to the ratio of energy lost to energy stored in the oscillating circuit
W is the frequency of the oscillating signal
e is the natural log. value 2.7128

As an external energy absorption medium such as the conductor 29 is progressively introduced into the magnetic field of inductor 10 and absorbs energy, the oscillating signal decrements more rapidly.

The oscillating signal from lead 21 is introduced into buffer 28 and the buffer isolates sensor 8 from the other circuit elements as previously mentioned. The initial negative peak P1 (FIG. 3) of the signal from buffer 28 is fed through to one input of an inverting peak detector 32 through the resistor 34. The other input of the peak detector 32 is grounded. The negative peak is inverted at the output of peak detector 32 and passes through diode 36 to place a positive voltage equal in value to peak P1 on capacitor 38. Resistor 35 is a conventional feedback resistor used in the peak detector circuit of peak detector 32.

The negative peak voltage P1 is also fed from point A through resistor 33 to one input of non-inverting peak detector 40. Since this voltage is negative, it cannot pass diode 42 to reach capacitor 44.

The positive voltage peak P2 (FIG. 3) is fed from point A through resistor 33 to one input of non-inverting voltage peak detector 40 and passes from the output of peak detector 40 through diode 42 to place the voltage of the positive peak P2 on capacitor 44.

The positive peak P2 is also fed through resistor 34 to inverting peak detector 32. However, the positive peak P2 is inverted at the output of peak detector 32 and is blocked by diode 36.

The loading of inductor 10 by the energy absorbing element 29 creates an increased damping effect on the oscillating signal. The signal progressively dampens more rapidly as the energy absorbing element approaches in closer proximity to the inductor 10 of sensor 8. As the position of the energy absorbing element 29 changes with respect to the inductor 10, the value of P1 and P2 decrease, with P2 decreasing faster than P1.

One lead 48 of voltage comparator 46 is connected to the capacitor 44. The other input lead 50 of voltage comparator 46 is connected to a potentiometer 52. The top of potentiometer 52 is connected to capacitor 38. The known voltage difference or ratio between the first and second peaks P1 and P2 of the signal, determined from testing, is set on potentiometer 52. Thus, when the input to the voltage comparator 46 through input 48, representing P2, is a predetermined ratio with respect to the voltage across potentiometer 52, representing a preselected portion of voltage peak P1, the output of voltage comparator 46 through conductor 54 can be utilized for switching to activate or deactivate some device 56 such as a light emitting diode or a relay for example.

To understand the circuit principle of the present invention, potentiometer 52 must be thought of as a ratio setting device and not a voltage adjustment for the P1 value on capacitor 38. If potentiometer 52 is set halfway on its adjustment, then its output to line 50 is one-half the value of P1 as established by the circuit elements on capacitor 38. As target 29 approaches sensor 8, it loads the magnetic field established by the oscillating inductor 10 and causes both P1 and P2 to decline in value but P2 declines faster than P1. As target 29 increasingly approaches inductor 10, P2 will become equal to or slightly less than one-half of P1, and the voltage comparator 46 will operate. Thus, the circuit operates when the damping causes the ratio of P2 to P1 to equal the ratio set on potentiometer 52 and the actual voltage from potentiometer 52 at the circuit trip point is immaterial. Also consider the above conditions when the sensor charging voltage from supply 18 varies. If 18 is doubled in value, then both P1 and P2 double, but the circuit trip point is unaffected since the ratio of P2 to P1 did not change—only both their absolute values increased. This circuit is insensitive to all outside influences which do not alter the ratio of P1 to P2. This characteristic in many ways makes this circuit comparable to the self-canceling features of a Wheatstone Bridge circuit.

A self-diagnosing feature in the form of a fault detector circuit may be provided as indicated at the bottom of FIG. 1 of the drawings by the number 58. The fault detector circuit includes a d.c. power supply 60. The positive side of the power supply is connected through potentiometer 62 and input lead 64 to a voltage comparator 66. An input lead 68 of voltage comparator 66 is connected to capacitor 38. The setting on potentiometer 62 is selected to make certain that sufficient negative peaks are present to make the ratio detection valid. If sufficient negative peaks are not present, a device 70 such as a light emitting diode or fault relay can be activated. If the inductor 10 or the capacitor 12 are either open or shorted, no negative pulses will be produced, thus a self-diagnosis is executed every time electronic switch 16 is operated by the square wave generator 20 without requiring the operator to take positive action by closing a testing switch, etc.

A visual indication of the voltage peak ratios can be provided with a digital voltmeter 72. Lead 74 extends from line 48 to connect one input of the voltmeter to capacitor 44. Lead 76 extends from lead 50 to connect the other input of the voltmeter 72 to the voltage on capacitor 38 as modified by the setting of potentiometer 52. Thus, the voltage ratio can be visually monitored.

An example of the application of the invention will now be described with respect to a machine tool wherein the invention operates as a contactless limit switch. The energy absorbing element 29 is positioned on a movable machine slide (not shown) and the sensor 8 is affixed to the non-movable machine frame (not shown). It is assumed that the slide is moving toward a work piece in the machine and that it is desired to stop the slide movement at some precise, predetermined position. The stop position of the slide movement, determined by a particular ratio of voltages between peak P1 and peak P2 of the oscillating signal, is set by potentiometer 52. As the energy absorbing element 29 on the slide reaches a position where the damping factor of the element 29 on the magnetic field of the resonant circuit of sensor 8 results in a voltage ratio equal to the ratio preset by potentiometer 52, the output of the ratio detector 46 operates a relay 56 to shut off a drive motor (not shown).

Several different positions may be detected by one sensor by paralleling several potentiometers with 52 and connecting the other voltage comparators like 46 so that different actions can be accomplished at different slide positions by each potentiometer providing a separately adjustable trip point. Such actions can be change feed rate of the machine slide; change speed of the tool on the slide; return the slide, etc. This is particularly useful in automated machine tool lines wherein many operations are controlled in the system. The device generates position intelligence before a trip point is reached and this information can be used as desired.

Figure 3:
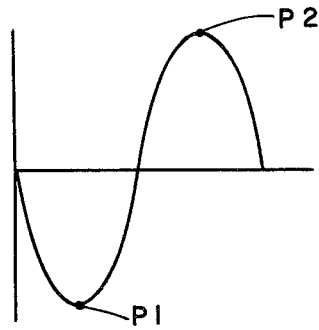
FIG. 3 is an enlarged view which depicts adjacent peaks of an oscillating signal when an external energy absorbing medium is proximate the resonant circuit of the sensor of FIG. 1.
Figure 4:
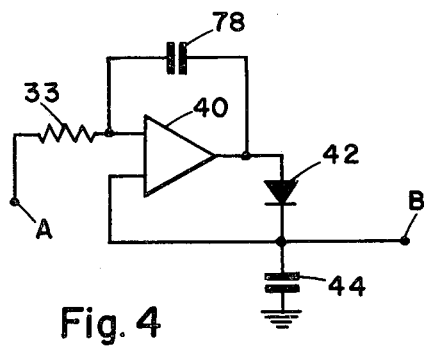
FIG. 4 is a circuit diagram disclosing a different circuit portion which replaces the circuit portion between points A and B in FIG. 1 to compare peak voltage with average voltage of the oscillating signal.

The ratio of peak voltages of the same signal has been demonstrated in the embodiment of the invention shown in FIGS. 1-3 of the drawings. Other parameters of the signal may be compared to each other such as peak voltage to average voltage, peak voltage to root mean square voltage, and root mean square voltage to average voltage. One such embodiment is demonstrated in FIG. 4 of the drawings. This embodiment shows a circuit which replaces the portion of the circuit between points A and B of FIG. 1 of the drawings to produce a peak voltage to average voltage comparison. A capacitor 78 is placed in the feedback loop of operational amplifier 40 between the output of the amplifier and the input resistor 33. The integrated voltage on capacitor 44 is compared to the peak voltage of capacitor 38 in this instance.

The root mean square voltage can be obtained by positioning conventional multiplying and dividing circuits well known to those skilled in the art in the circuit between points A and B.

Figure 5:
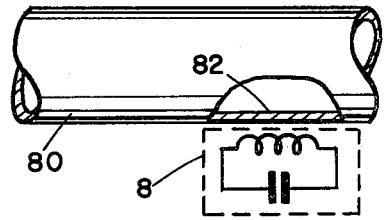
FIG. 5 is a schematic view showing the sensor of the present invention positioned adjacent a metal pipe to detect expansion or contraction of the pipe as pressure varies inside the pipe.

FIG. 5 demonstrates another application of the present invention wherein the sensor 8 is positioned adjacent a pipe 80 having a metal side wall 82. As the fluid pressure in the pipe increases or decreases, the side wall 82 is deflected and the sensor 8 senses the deflections to provide an accurate readout on the voltmeter 72 of FIG. 1. The potentiometer 52 can be set at a point which will prevent rupturing of the pipe 80 due to excessive pressure by using the output from comparator 46 as a pressure control signal.

Figure 6:
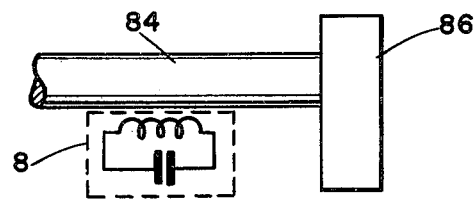
FIG. 6 is a schematic view showing the sensor of the present invention adjacent a rotating shaft for detecting a difference in the position of the shaft due to wear or overheating.

Another application of the device of the present invention is shown in FIG. 6 of the drawings wherein sensor 8 is positioned adjacent rotating shaft 84 which is supported by journal 86. As the position of rotating shaft 84 shifts with respect to sensor 8, due to bearing wear or heating, this information is detected by the sensor 8 and can be read out on the voltmeter 72 in the circuit of FIG. 1. Potentiometer 52 can be set so that the output of voltage comparator 46 will shut down the drive motion which runs the shaft 84 when the shaft is overheated or reaches a predetermined wear point.

FIG. 7 shows an energy absorption element 29 which comprises a base of electrical insulating material covered by a coating of material characterized by electrical conductivity that varies with light. Gallium arsenide is an example of such material. This element is positioned proximate inductance means 10 of sensor 8. A means is associated with such element for varying its exposure to light. One such means is shown including an opaque wall 90 with an aperture 92. A slide 94 is positioned adjacent the wall 90 and is movable relative thereto so as to permit light from light source 96 to impinge upon energy absorption element 29. As the exposure of the element 29 to light varies, its conductance varies and thus the amount of energy absorbed from the magnetic field of inductance means 10 varies. This is reflected in the sensing device of the present invention by its damping effect on the oscillating signal from the resonant circuit of sensor 8. For example, the element 29 can measure and closely control the light intensity in photographic developing processes by utilizing the output from comparator 46 to move the slide 94.

FIG. 8 shows a resistive effect element 29 of material characterized by the fact that its conductivity varies with heat. Aluminum is an example of such a material. Its conductivity decreases as its temperature increases. The element is positioned proximate the inductance means 10 of the sensor 8. As the temperature of element 29 varies, its conductivity varies and thus its loading effect upon the magnetic field causes a variation of the damping effect upon the oscillating signal generated by the resonant circuit of sensor 8. For example, element 29 can be a current control device wherein electric current through the said element which exceeds a predetermined amount, determined by the setting of potentiometer 52 (FIG. 1), will effect control from the output of comparator 46.

The resistive effect element 29 can be affixed to the sensor 8 as a heat measuring device for closely monitoring the heat in a medium which is adjacent the sensor. As heat from the medium heats the element 29, its conductance changes and its damping effect upon the signal generated by the resonant circuit of sensor 8 changes. A critical temperature can be set by potentiometer 52 (FIG. 1) to control a heat source for the medium for example.

The resistive effect element 29 of FIG. 8 also represents a device that has been coated with electrically conductive material by means such as electroplating for example. The element is positioned in a fixture (not shown) proximate the inductance means 10 of sensor 8, and its energy absorption effect is measured. After the element is coated it is again placed in the fixture and its energy absorbing effect is measured. Thin coatings can be accurately measured because the sensing device will measure the changed position, due to the coating thickness, to within 20 microns accuracy.

FIG. 9 of the drawings discloses an embodiment of the invention wherein a differential input ratiometric digital voltmeter 98 is used to measure the difference in the second peak P2 and a ratio, as set by potentiometer 100, of the first peak P1. This difference is divided by the voltage input to the reference terminal which is the value of peak P1. Thus, the meter 98 reads the decrement ratio of the resonant circuit in sensor 8 less the ratio set on potentiometer 100. The voltmeter includes a square wave generator for operating switches 16 and 26. An example of such meter is the Model 4500 manufactured by Texmate Inc. of Solana Beach, California.

This embodiment includes buffer 102 with one terminal connected to capacitor 38 and resistor 106. The output of buffer 102, which is the voltage of P1, is fed back through resistor 108 to the positive side of diode 110 and to one input of peak detector 32. The output of buffer 102 is also fed to the top of potentiometer 100.

A buffer 112 has one terminal connected to capacitor 44 and resistor 114. The output of buffer 112, which is the voltage of P2, is fed back through resistor 116 to the positive side of diode 118 and to one input of peak detector 40. The output of buffer 112 is also fed to the negative terminal of voltmeter 98. The potentiometer arm is connected to the positive terminal of voltmeter 98.

FIG. 10 shows an embodiment wherein the output of buffer 102, which is P1 voltage, is fed back through resistor 120 to a terminal of inverting power amplifier 122. The other terminal of amplifier 122 is connected through resistor 123 to the positive side of d.c. power source 124, which can be fifteen volts for example, and to Zener Diode 126. The output of power amplifier 122 is connected to switch 16, resistor 128 and capacitor 130. This circuit maintains the first peak P1 at a predetermined value such as ten volts for example.

As the resistive effect element or energy absorbing medium 29 moves closer to the magnetic field of inductor 10, the size of the first voltage peak P1 decreases. Both the absolute values of the first and second peaks and the ratio of the second peak to the first change as circuit damping is increased due to medium 29 moving closer to the sensor 8. As the first peak commences to decrease, the feedback loop from buffer 102 through power amplifier 122 increases the voltage on capacitor 130 and consequently the charging voltage to the sensor 8 through switch 16, thereby tending to increase the sensor output so as to maintain the P1 voltage at the predetermined value of ten volts. Thus, the second peak P2 will always be a ratio involving a fixed value of P1 (10 volts in the above example).

The output of buffer 112, which is the value of peak P2, is fed to the negative terminal of voltmeter 132. The positive terminal of voltmeter 132 is connected to potentiometer 134. The top of potentiometer 134 is connected to the output of buffer 102 which is the value of peak P1. In the example shown, the starting ratio or zero point is set on the potentiometer 134 making the positive meter terminal a ratio of the positive peak P2. This circuit, with a ten volt value of P1 gives a meter reading of ten times the difference between the decrement ratio and the ratio set at zero on potentiometer 134. The value of P1 is a multiplier or scale factor of the difference between the ratio of P2 to P1 and the ratio value set on potentiometer 134. By way of explanation, if the decrement ratio (damping) of P2 to P1 is set equal to the ratio on potentiometer 134, voltmeter 132 will read zero regardless of the absolute value of P1 (it can be varied from 0 to 1000 volts).

The device of the present invention provides a simple and stable means for detection which will measure various phenomena to a very high degree of accuracy.

While the present invention has been illustrated and described by means of particular embodiments and applications, it is to be understood that changes and modifications may be made therein without departing from the spirit and scope of the invention as defined in the appended claims.

I claim:

1. A measuring and control device that measures or controls by detecting the energy absorbed by an energy absorbing resistive effect element in proximity to the magnetic field of an inductance means, comprising:

power supply means;

resonant circuit means including inductance means and capacitance means electrically coupled for oscillation and electrically connected to said power supply means;

detection and comparison circuit means electrically connected to said resonant circuit means for receiving an oscillating signal from said resonant circuit means when said resonant circuit means is oscillating and comparing the values of different parameters of the same oscillating signal to provide a ratio of said parameter values that indicates the damping effect upon said signal caused by the presence of said resistive effect element in the magnetic field of said inductance means for measurement and control purposes without using a separate reference value;

switching means electrically connected to said power supply means and said resonant circuit means for alternately completing the circuit between said resonant circuit means and said power supply means for energizing said resonant circuit means and then breaking the circuit between said power supply means and said resonant circuit means whereupon said resonant circuit means passes an oscillating signal to said detection and comparison circuit means; and actuating means for actuating and deactuating said switching means at a frequency that is independent of the frequency of oscillation of said resonant circuit means.

2. A measuring and control device according to claim 1 wherein said detection and comparison circuit means for measuring and comparing different parameter values of the same oscillating signal includes means for measuring the ratio of oscillating signal voltages of different peaks.

3. A measuring and control device according to claim 1 wherein said detection and comparison circuit means for measuring and comparing different parameter values of the same oscillating signal includes means for measuring the ratio of peak voltage to half-cycle average voltage.

4. A measuring and control device according to claim 1 wherein said detection and comparison circuit means for measuring and comparing different parameter values of the same oscillating signal includes means for measuring the ratio of peak voltage to root mean square voltage.

5. A measuring and control device according to claim 1 wherein said detection and comparison circuit means for measuring different parameters of the same oscillating signal includes means for measuring the ratio of root mean square voltage to half-cycle average voltage.

6. A measuring and control device according to claim 1 including an energy absorbing resistive effect element located in a precise location adjacent said resonant circuit means and wherein its loading effect upon the magnetic field of said inductance means is usable by said detection and comparison circuit means to determine the material of said energy absorbing resistive effect element.

7. A measuring and control device according to claim 1 including an energy absorbing resistive effect element constructed of a material whose resistance changes with changes in light and wherein its resistance is measurable by said detection and comparison circuit means.

8. A measuring and control device according to claim 1 including an energy absorbing resistive effect element constructed of material whose electrical conductivity changes with changes in temperature, and wherein the conductance of said energy absorbing resistive effect element is measurable by said detection and comparison circuit means.

9. A measuring and control device according to claim 1 including an energy absorbing resistive effect element that is a movable electrical conductor and its location relative to the location of said inductance means is indicative of its absorbing effect on said oscillating signal, and such location detectable by said detection and comparison circuit means.

10. A measuring and control device according to claim 1 including an energy absorbing resistive effect element coated with an electrically conductive material positioned in a precise location adjacent said resonant circuit means whereby the thickness of said electrically conductive coating is measurable by said detection and comparison circuit means.

11. A measuring and control device according to claim 1 including an energy absorbing resistive effect element composed of material that alters its electrical conductivity when subjected to strain and the resultant oscillating signal from said energy absorbing resistive effect element is usable by said detection and comparison circuit means to measure said strain.

12. A measuring and control device according to claim 1 including an energy absorbing resistive effect element that is a pipe of electrically conductive material that expands in a radial direction when it has a fluid under pressure therein, and the expansion of the pipe is measurable by said detection and comparison circuit means to indicate the pressure in the pipe.

13. A measuring and control device according to claim 1 including digital read out means for indicating the ratio between the different parameter values of said oscillating signal.

14. A measuring and control device according to claim 1 including means for maintaining one parameter value of said oscillating signal at a constant predetermine value.

15. A measuring and control device according to claim 1 including means for automatically diagnosing the operation of the device.

16. A measuring and control device according to claim 1 including second switching means electrically connected to said resonant circuit means and to ground, and timed with said first switching means for passing to ground any initial charging spike that may occur when the resonant circuit means is initially energized by said power supply means.

17. A measuring and control device according to claim 1 wherein said detection and comparison circuit means includes first peak detection and storage circuit means for detecting a first voltage peak of said oscillating signal at one point in time and storing said first voltage peak;

second peak detection and storage circuit means for detecting a second voltage peak of said oscillating signal at a later point in time and storing said second voltage peak; and variable resistance means electrically connected to said first peak detection and storage circuit means and to one input of a voltage comparator, the other input of said voltage comparator being electrically connected to said second peak detection and storage circuit means;

whereby a preselected voltage that is a ratio of said first voltage peak can be set by said variable resistance means for input into said voltage comparator and the voltage output of said voltage comparator equals the first peak voltage times the difference between the second peak voltage and the preselected voltage, the output of said comparator performing an indicating and control function.

* * * * *